United States Patent [19]
Suzuki et al.

[11] Patent Number: 5,784,537
[45] Date of Patent: Jul. 21, 1998

[54] ONE-CHIP MICROCOMPUTER CAPABLE OF EXECUTING CORRECTION PROGRAM AND MICROCOMPUTER CAPABLE OF CORRECTING ROM

[75] Inventors: Takashi Suzuki, Hino; Azuma Miyazawa, Mitaka; Koji Mizobuchi, Sagamihara, all of Japan

[73] Assignee: Olympus Optical Co., Ltd., Tokyo, Japan

[21] Appl. No.: 564,861

[22] Filed: Nov. 30, 1995

[30] Foreign Application Priority Data

Dec. 13, 1994 [JP] Japan .................. 6-308743

[51] Int. Cl.$^6$ .................................................. G06F 11/00
[52] U.S. Cl. .................. 395/182.03; 395/182.04; 395/182.06
[58] Field of Search .................. 395/800, 182.04, 395/182.06, 182.03

[56] References Cited

U.S. PATENT DOCUMENTS 5,454,100  9/1995  Sagane .................. 395/182.06
5,574,926  11/1996  Miyazawa et al. .................. 395/800
5,592,613  1/1997  Miyazawa et al. .................. 395/182.04
5,619,678  4/1997  Yamamoto et al. .................. 395/492

FOREIGN PATENT DOCUMENTS

7-49853  2/1995  Japan .

Primary Examiner—Alyssa H. Bowler
Assistant Examiner—Walter D. Davis, Jr.
Attorney, Agent, or Firm—Frishauf, Holtz, Goodman, Langer & Chick

[57] ABSTRACT

An instruction for returning to a ROM is written to a position where data is not broken even if a next correction is executed in order not to the content of a register even if an interruption processing for correction and a processing for returning a ROM program are executed. A microcomputer connected through a serial i/O bus, an EEROM, and a correction data writing device comprises a CPU, a RAM, a ROM, a PC comparison register section, a ROM correction processing circuit having a PC value latch section, and a serial i/O section. The CPU sequentially executes an internal sequence control of the microcomputer and a logical operation in accordance with instructions written in the ROM as a program in advance. The RAM temporarily saves intermediate processing data of, e.g. calculation, or saves an adjustment value transferred from the EEPROM when the program is actually executed.

12 Claims, 10 Drawing Sheets

F I G. 1

F I G. 2A

F I G. 2B

①  0××(H)

| 1 | 0 | 0 | 1 | 1 | 0 | 1 | 0 |
|---|---|---|---|---|---|---|---|
| 0 | 0 | 1 | 1 | 1 | 0 | 1 | 0 |

NUMBER OF CORRECTING PORTIONS (UPPER 2 BITS) MODULE CODE No. (LOWER 6 BITS) REFERENCE AREA

TOTAL NUMBER OF USING BYTES REFERENCE AREA (3AH = 58 BYTES IN THIS EXAMPLE)

| NUMBER OF USING BYTES * |
| CORRECTION PROGRAM HEAD ADDRESS |

THIRD CORRECTION EXECUTION ADDRESS AND NUMBER OF USING BYTES REFERENCE AREA

| NUMBER OF USING BYTES * |
| CORRECTION PROGRAM HEAD ADDRESS |

SECOND CORRECTION EXECUTION ADDRESS AND NUMBER OF USING BYTES REFERENCE AREA

| NUMBER OF USING BYTES * |
| CORRECTION PROGRAM HEAD ADDRESS |

FIRST CORRECTION EXECUTION ADDRESS AND NUMBER OF USING BYTES REFERENCE AREA

| UPPER ADDRESS |
| LOWER ADDRESS |

RETURN ADDRESS REFERENCE AREA AFTER THIRD CORRECTION PROGRAM EXECUTION

| UPPER ADDRESS |
| LOWER ADDRESS |

THIRD CORRECTION EXECUTION INTERRUPTION ADDRESS REFERENCE AREA

| UPPER ADDRESS |
| LOWER ADDRESS |

RETURN ADDRESS REFERENCE AREA AFTER SECOND CORRECTION PROGRAM EXECUTION

| UPPER ADDRESS |
| LOWER ADDRESS |

SECOND CORRECTION EXECUTION INTERRUPTION ADDRESS REFERENCE AREA

| UPPER ADDRESS |
| LOWER ADDRESS |

RETURN ADDRESS REFERENCE AREA AFTER FIRST CORRECTION PROGRAM EXECUTION

| UPPER ADDRESS |
| LOWER ADDRESS |

FIRST CORRECTION EXECUTION INTERRUPTION ADDRESS REFERENCE AREA

| CORRECTION PROGRAM AREA FOR THIRD CORRECTION |
| CORRECTION PROGRAM AREA FOR SECOND CORRECTION |
| CORRECTION PROGRAM AREA FOR FIRST CORRECTION |

| X | X | X | X | X | X | X | X |
| X | X | X | X | X | X | X | X |

NEXT CORRECTION MODULE REFERENCE AREA

| RAM ADDRESS | MSB | | | | | | | LSB | |
|---|---|---|---|---|---|---|---|---|---|
| 100 (H) | 0 | 0 | 1 | 0 | 1 | 0 | 1 | 0 | @7~@0 |
| 101 (H) | 0 | 1 | 0 | 0 | 0 | 0 | 0 | 0 | @15~@8 |
| 102 (H) | 0 | 0 | 0 | 1 | 0 | 0 | 0 | 0 | @16~@9 |
| 103 (H) | 0 | 0 | 0 | 0 | 0 | 0 | 0 | 0 | @24~@17 |
| 104 (H) | 0 | 0 | 0 | 0 | 0 | 0 | 0 | 0 | @32~@25 |
| 105 (H) | 0 | 0 | 1 | 0 | 0 | 0 | 1 | 0 | @40~@33 |

FIG. 6

| | | | | | | | | | |
|---|---|---|---|---|---|---|---|---|---|
| @0XX(H) | 0 | 1 | 0 | 0 | 0 | 0 | 1 | 1 | NUMBER OF CORRECTING PORTIONS OF @1 MODULE MODULE CODE No, TOTAL NUMBER OF USING BYTES REFERENCE AREA |
| (@1) | 0 | 0 | 0 | 1 | 1 | 1 | 1 | 1 | |
| CORRECTION OF @1 MODULE PROGRAM AREA | | | | | | | | | |
| (@2) | 1 | 1 | 0 | 0 | 1 | 0 | 1 | 0 | NUMBER OF CORRECTING PORTIONS OF @2 MODULES MODULE CODE No, TOTAL NUMBER OF USING BYTES REFERENCE AREA |
| | 0 | 0 | 1 | 0 | 1 | 0 | 0 | 0 | |
| CORRECTION OF @2 MODULE PROGRAM AREA | | | | | | | | | |
| (@5) | 1 | 0 | 0 | 0 | 1 | 1 | 1 | 1 | NUMBER OF CORRECTING PORTIONS OF @5 MODULES MODULE CODE No, TOTAL NUMBER OF USING BYTES REFERENCE AREA |
| | 0 | 0 | 0 | 0 | 0 | 1 | 1 | 1 | |
| CORRECTION OF @5 MODULE PROGRAM AREA | | | | | | | | | |

ONE-CHIP MICROCOMPUTER CAPABLE OF EXECUTING CORRECTION PROGRAM AND MICROCOMPUTER CAPABLE OF CORRECTING ROM

BACKGROUND OF THE INVENTION

1. Field of the Invention

The present invention relates to a one-chip mirocomputer, which is capable of executing a correction program and a microcomputer, which is capable of correcting a ROM, and more particularly to a management of a memory register during a ROM data processing.

2. Description of the Related Art

Conventionally, in a one-chip microcomputer having a memory device such as a ROM, if there is discovered a problem in a program, which is prepared and stored in the ROM at the time of designing, during the manufacture or after the manufacture, that is, necessity of correcting the problem occurs, the program must be manufactured again to change the program.

In order to solve the above problem, Japanese Patent Application KOKAI No. 7-49853, which was filed by the same applicant as this application, proposed a microcomputer system comprising one ROM correction interruption processing circuit to be capable of correcting a plurality of portions of a program.

However, in Japanese Patent Application KOKAI No. 7-49853, there was not considered the management of the memory (particularly RAM) and a register in generating a ROM correction interruption. Therefore, if the ROM correction interruption is generated when ROM data is arbitrarily accessed (execution of ROM program) in this system, breakage of RAM data or malfunction of the mirocomputer is brought about.

SUMMARY OF THE INVENTION

According to the present invention, an object of the present invention is to provide a one-chip microcomputer, which is capable of executing a correct program, regardless of time when ROM correction interruption is generated or not, and a microcomputer, which is capable of correcting a ROM.

An object of the present invention is to provide a one-chip microcomputer capable of correcting a main program stored in a built-in mask ROM in a pseudo manner, comprising first storing means for storing a correction address to be corrected of the main program stored in the mask ROM; second storing means for storing a correction program in accordance with the correction address; comparing means for comparing the correction address stored in the first storing means with an address designated by a program counter so as to output a coincident signal when these addresses are coincident with each other; program executing means for executing the correction program by an interruption processing in accordance with the coincident signal; exchanging means for exchanging the correction address and the correction program to be used next in the first and second storing means after the end of the execution of the correction program by the program executing means; saving means for saving various data stored in a register of the one-chip microcomputer or a RAM prior to the exchanging operation of the exchanging means; and returning means for returning the various data saved by the saving means to the register or the RAM after the end of the exchanging operation of the exchanging means.

Another object of the present invention is to provide a one-chip microcomputer capable of executing a correction program, including a serial communication interface circuit capable of communicating with an outer memory and an outer unit through an outer bus comprising: latching means for storing a predetermined correction address value; a random access memory for storing a correction program in accordance with the correction address value; writing means for writing the correction address value and the correction program from the outer memory to the latching means and the random access memory through the serial communication interface circuit; interruption generating means for comparing the address value stored in the latching means with a program count value during the execution of the main program stored in a main memory of the one-chip microcomputer so as to generate interruption when the address value and the program counter value are coincident with each other; program correcting means for executing the correction program stored in the random access memory by the generation of the interruption; and saving means for saving data not to change the content of the memory used in both the main program and the correction program during the succession of processings of the main program and the correction program.

Further, another another object of the present invention is to provide a one-chip microcomputer capable of correcting a main program stored in a built-in mask ROM in a pseudo manner, comprising: storing means for storing a correction address to be corrected of the main program stored in the mask ROM; comparing means for comparing the correction address stored in the storing means with an address designated by a program counter so as to output a coincident signal when these addresses are coincident with each other; program executing means for executing the correction program in accordance with the coincident signal; exchanging means for exchanging the correction address to be used next in the storing means after the end of the execution of the correction program by the program executing means; saving means for saving various data stored in a register of the one-chip microcomputer or a RAM prior to the exchanging operation of the exchanging means; and returning means for returning the various data saved by the saving means to the register or the RAM after the end of the exchanging operation of the exchanging means.

Further another object of the present invention is to provide a one-chip microcomputer capable of correcting a ROM, comprising: setting means for setting one correction address of a plurality of addresses to be corrected in a program stored in the ROM; correction program executing means for executing a correction program corresponding to the correction address when the correction address set by the setting means is coincident with a program counter; and saving means for saving data to be temporarily used in the one-chip microcomputer at the time of operation for changing the correction address to other correction address of the plurality of correction addresses after executing the correction program by the correction program executing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

DETAILED DESCRIPTION OF THE PREFERRED EMBODIMENTS

An embodiment of the present invention will be described with reference to the drawings.

Figure 1:
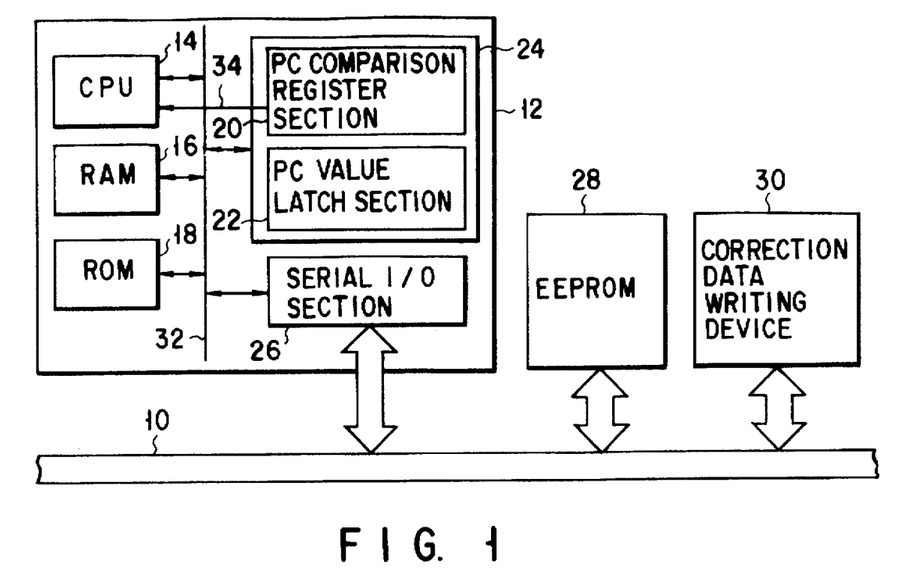
FIG. 1 is a general view showing the structure of a microcomputer, which is capable of executing a correct program, according to the present invention.

FIG. 1 is a general view showing the structure of a microcomputer, which is capable of executing a correct program, according to the present invention.

A system shown in FIG. 1 comprises a microcomputer (one-chip microcomputer) 12 connected through a serial i/O bus 10, an EEROM 28, and a correction data writing device 30. Data is mounted on the serial i/O bus 10, so that the respective blocks can be communicated with each other in two way directions. Generally, since writing is performed at the time of manufacture, the correction data writing device 30 may be detached from the system when the system is shipped to a user.

The microcomputer 12 comprises a CPU 14, a RAM 16, a ROM 18, a PC (program counter) comparison register section 20, a ROM correction processing circuit 24 having a PC value latch section 22, and a serial i/O section 26. The respective components are connected to each other through an internal bus 32. The CPU 14 sequentially executes an internal sequence control of the microcomputer 12 and a logical operation in accordance with instructions written in the ROM 18 as a program in advance.

The RAM 16 is used as a working area for temporarily saving intermediate processing data of, e.g. calculation, or for storing an adjustment value (including a flag) transferred from the EEPROM 28 when the program is actually executed. In the data communication through the serial i/O bus 10, the serial i/O section 26 receives/transmits serial data having 8 to 16 bits per unit word from/to an EEPROM 28 or the correction data writing device 30.

At this time, received/transmitted data is stored in the RAM 16 and the PC value latch section 22 of the ROM correction processing circuit 24 through the internal bus 32 of the microcomputer 12 as required. The PC comparison register section 20 of the ROM correction processing circuit 24 compares a value stored in the PC latch section 22 with an address value (program counter value) of the internal bus 32. Then, if these values are consistent with each other, the PC comparison register section 20 outputs an interruption request signal 34 to the CPU 14. Therefore, if an arbitrary address value for interruption processing is set in the PC value latch section 22 of the ROM correction in advance, interruption processing can be automatically executed to the CPU 14 when the value of the program counter is equal to the value of the PC value latch section 22. In other words, if one ROM correction processing circuit 24 is provided, it is possible to execute the program other than the ROM 18 while the program of the ROM 18 is executing.

For example, in the normal main routine, a plurality of sub-routine modules are present. Then, for changing the program in some subroutine modules, a module code number, serving as an identification code for distinguishing the respective subroutine modules from each other in advance, may be provided to each of the subroutine modules.

Figures 2A, 2B:
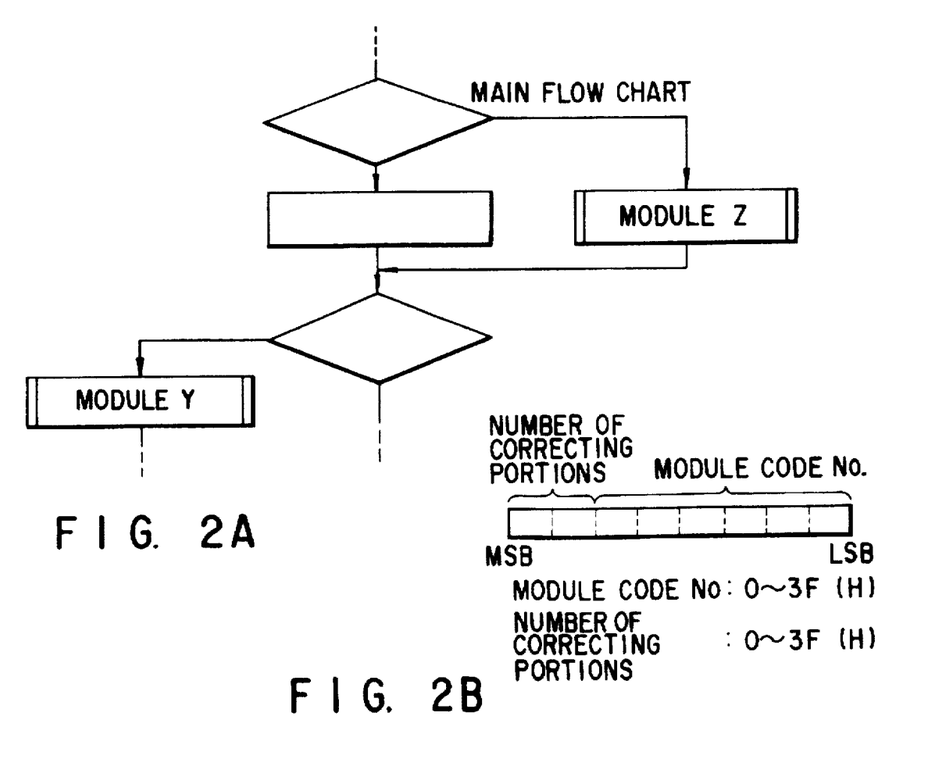
FIG. 2A is a view showing one example of a sub-routine module identification code.
FIG. 2B is a view showing one example of a format of FIG. 2A.

FIG. 2A shows one example of the subroutine module identification code, and FIG. 2B shows an example of the format.

As mentioned above, various sizes of subroutine modules are present. Therefore, module code No. is provided to each of the subroutine modules to avoid the mixture.

As shown in FIG. 2B, if the lower 6 bits (bit 5 to LSB) are set to a module code No. per one byte and the residual 2 bits (MSB and bit 6) are set to express the number of correcting portions in the module, the maximum number of modules to be dealt with becomes 64 (3F (H) to 0 (H)), and the maximum number of correcting portions is four (3 (H) to 0 (H)). Further, if the number of bits is increased, it is of course possible that the number of modules to be dealt with and the number of correcting portions can be increased.

As mentioned above, in the subroutine module to which the module code No. is provided, the following correction can be executed without providing a rewrite correction of the ROM 18 of FIG. 1 if a correction execution address value, a correction execution interruption address value, and a correction program are reserved in the EEPROM 28. If there is no correction, it is unnecessary to reserve the memory area of the EEPROM 28, and wasteful use of the memory capacity of EEPROM 28 can be avoided.

Figure 3:
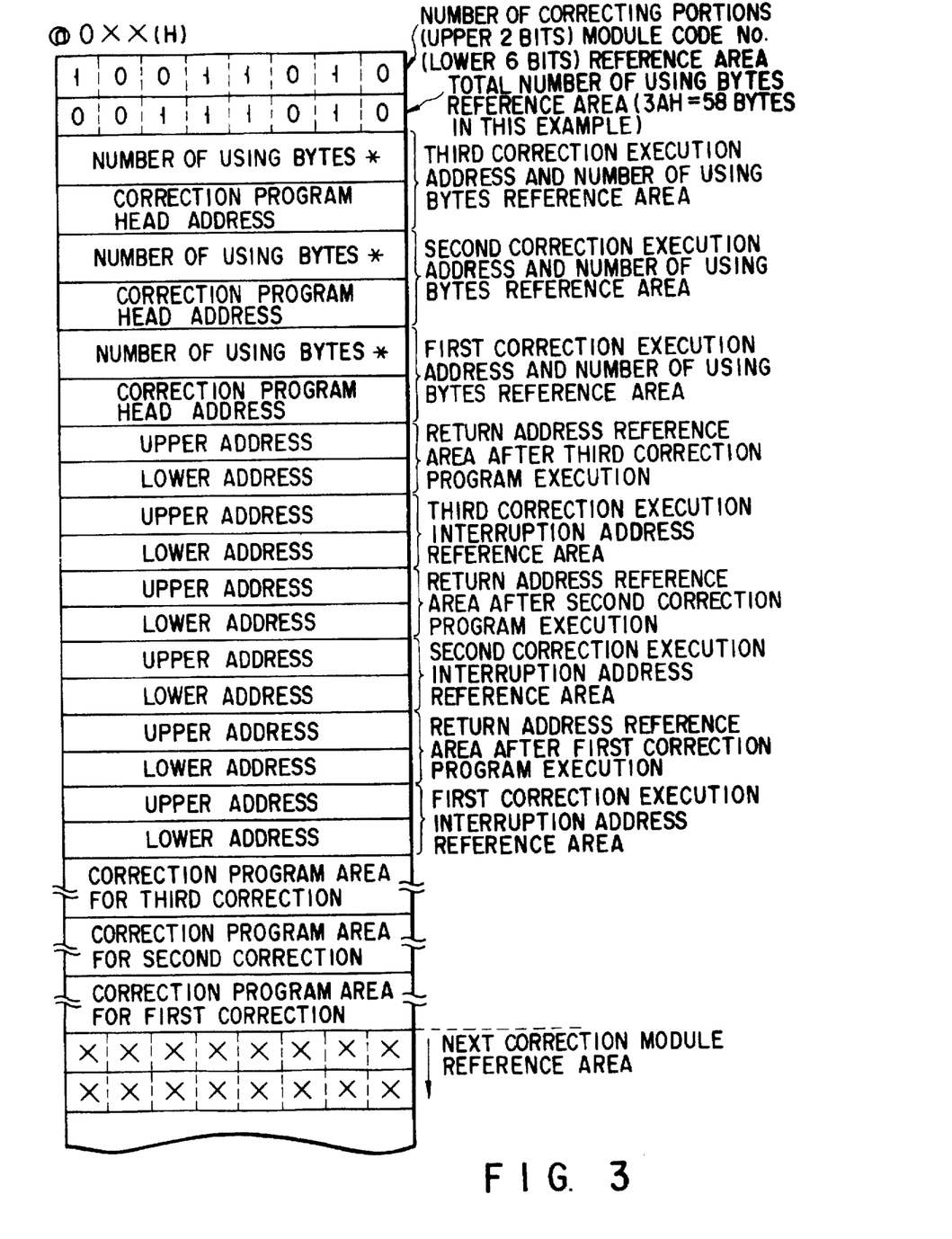
FIG. 3 is a view showing one example of a data format reserved in an EEPROM of FIG. 1 at the time of interruption.

FIG. 3 shows an example of a data format reserved in the EEPROM 28 (hereinafter called ROM correction data area) at the time of the interruption processing. The data format of FIG. 3 is assumed based on an EEPROM of 8 bits/address. However, there is no limitation in the bit length, and no problem occurs if an EEPROM of 16 bits/address is used.

First of all, the number of correcting portions and the module code No. are stored in a head address "@0xx (H)" of the ROM correction data area. Then, next one byte shows the total number of use bytes of EEPROM, which is needed in the correction made by the module. As an address after the head address +2), there are sequentially stored a correction execution address (number of use bytes, head address to which the correction program is stored in EEPROM), a return address (upper address, lower address) after the execution of the correction program, a correction execution interruption address (upper address, lower address), and a correction address.

In the example shown in FIG. 3, it is assumed that three portions to be corrected are present in one module. Due to this, the number of bytes, which is needed to designate the lower address value of the first correction execution interruption address, is 20 bytes. However, the number of use bytes marked by "*" in the figure may not be set since the number of bytes of each correction program can be obtained by subtracting the respective correction program head address values from each other. In this example, the number of use bytes of the first to third correction program areas is a value (38 bytes), which can be obtained by subtracting 20 bytes from the total number of use bytes (58 bytes).

Figure 4A:
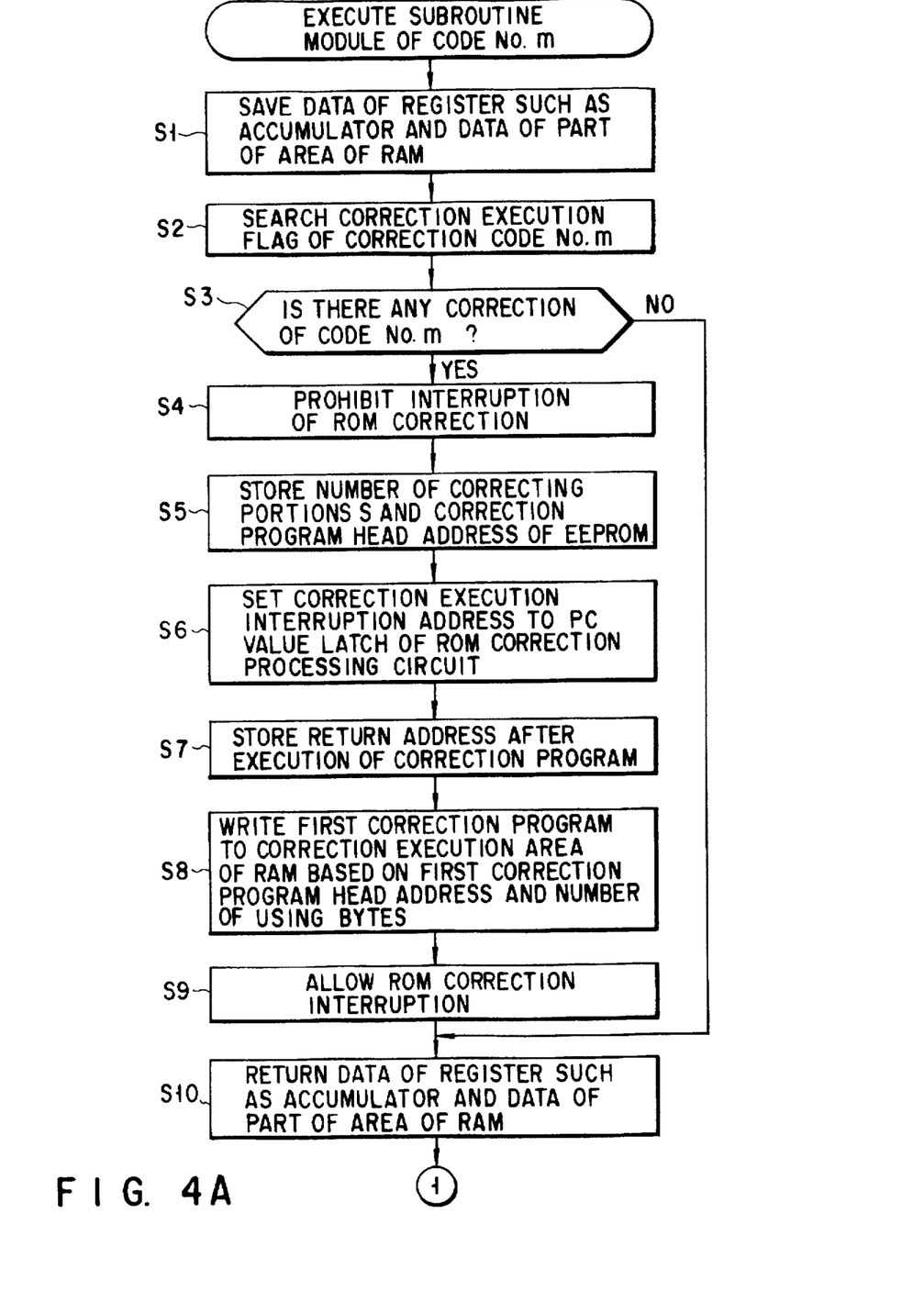
FIGS. 4A and 4B are flow charts explaining an operation when a sub-routine mode of a code No. m of the microcomputer of FIG. 1 is executed.
Figure 4B:
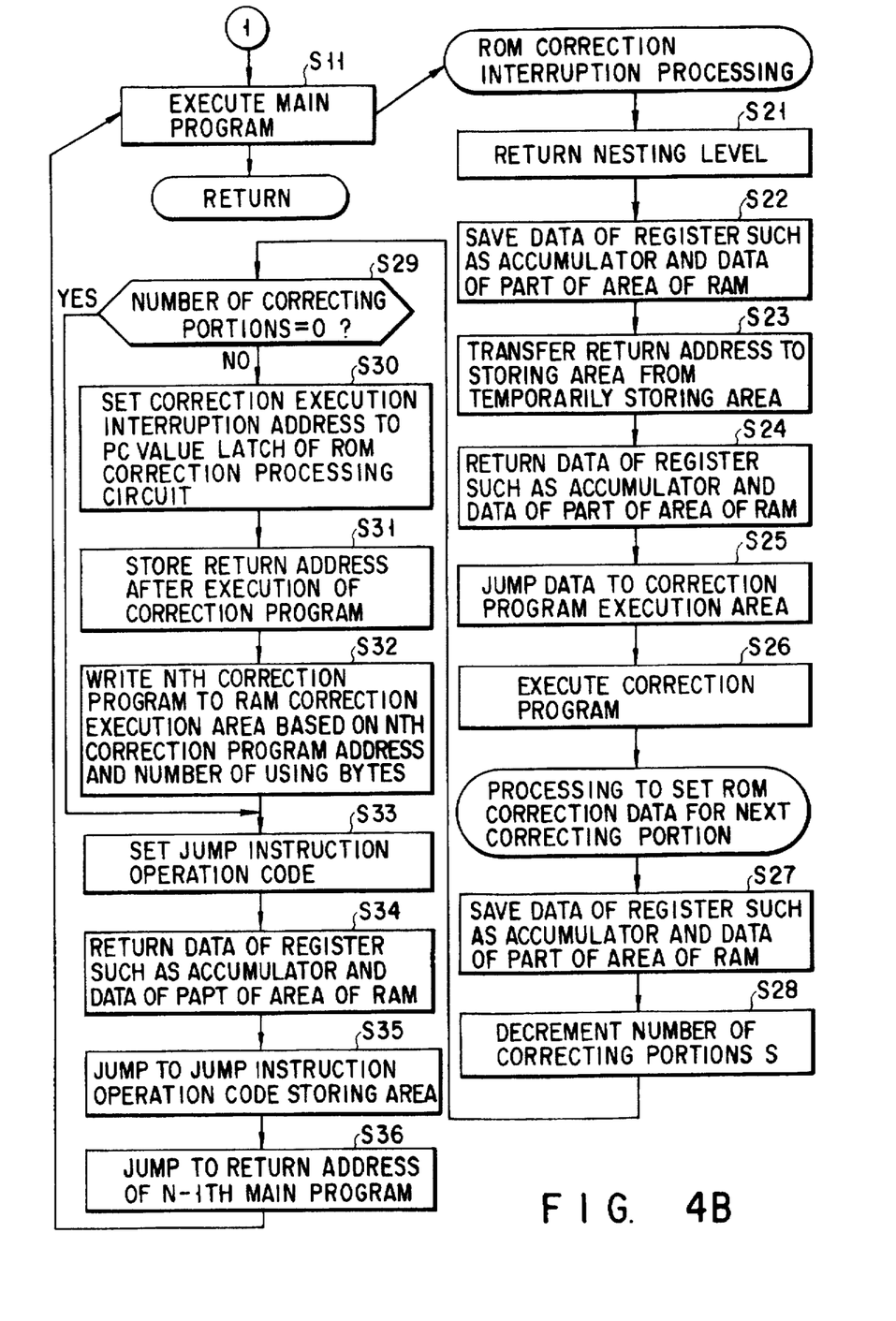
Figure 5:
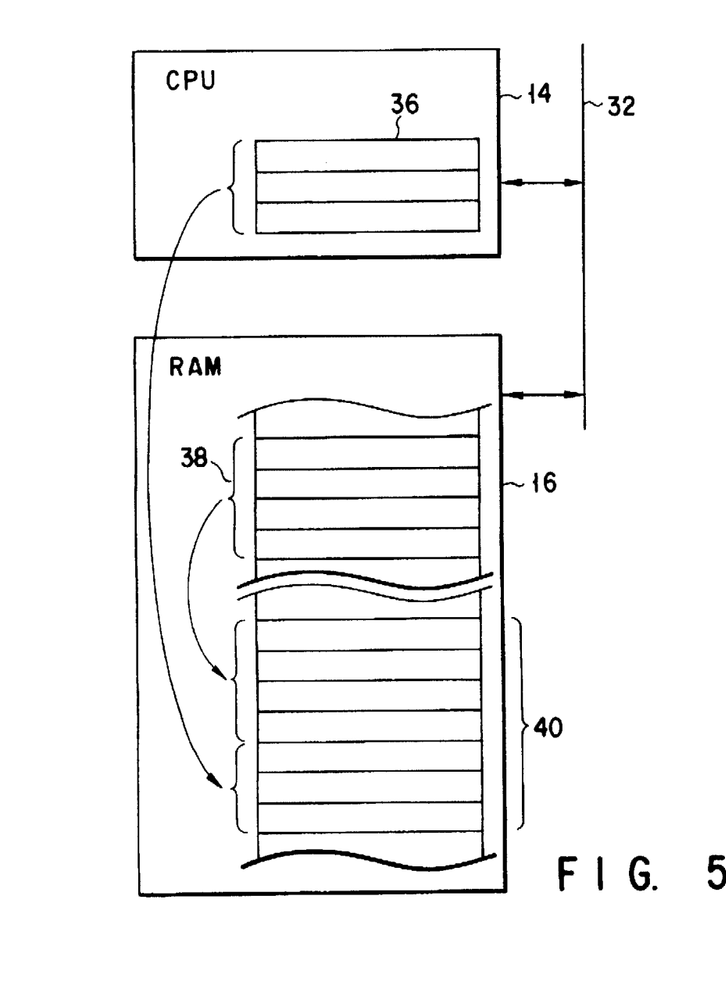
FIG. 5 is a view schematically showing a register such as an accumulator of CPU used in steps S2 to S5 of FIG. 4A, area data of a part in RAM, and an area to be transferred.

The following will explain an example when the subroutine module whose code No. is m with reference to FIGS. 4A, 4B, and 5.

FIGS. 4A, 4B and 5 are flow charts explaining an operation when the subroutine module whose code No. is m is executed in the above-explained structure.

First of all, if the subroutine module whose code No. is m is executed, data of the register 36 such as the accumulator of the CPU 14 to be used in steps S2 to S5 and a part of area data 38 are transferred to a predetermined area 40 in the RAM 16 through the bus 32 (hereinafter, this processing is called data saving) prior to steps S2 to S5 to be described later (step S1). In this case, the register 36 and area data 38 are shown by 3 bytes and 4 bytes, respectively, in the example of FIG. 5. However, these values are not so limited. Moreover, data to be transferred to the area 40 in the RAM 16 is 3 bytes of the register 36+4 bytes of area data 38=7 bytes.

Figure 6:
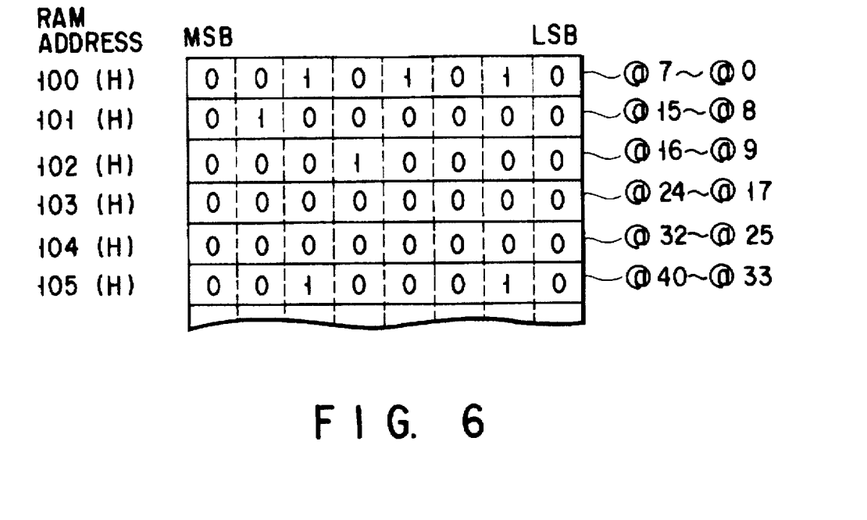
FIG. 6 is a view showing one example of a flag area of RAM.

Then, a flag of code No. m is searched from the correction execution flags, which are transferred to the flag area of the RAM 16 from the EEPROM 28 in advance (step S2). As shown in FIG. 6, one bit is allocated to each flag area of the RAM 16 (the flag area is allocated from "address 100 (H) in the figure). For example, it is predetermined that a correction is present if the bit of the corresponding code No. is "1", and no correction is present if the bit of the corresponding code No. is "0" (in the figure, @1, @3, @5, @14 are code numbers having a correction).

Similarly, it is checked whether or not the flag of the corresponding code No. m is present (step S3). If no flag is present, it is discriminated that no correction is present, and the processing goes to step S10 to be described later.

On the other hand, if the flag is present in step S3, the ROM correction interruption is prohibited (step S4). The processing of step S4 is to prevent the malfunction of the CPU 14 by prohibiting the ROM correction interruption when a parameter of the ROM correction interruption is set to the ROM correction processing circuit 24 in the following step 5 and the after.

Figure 7:
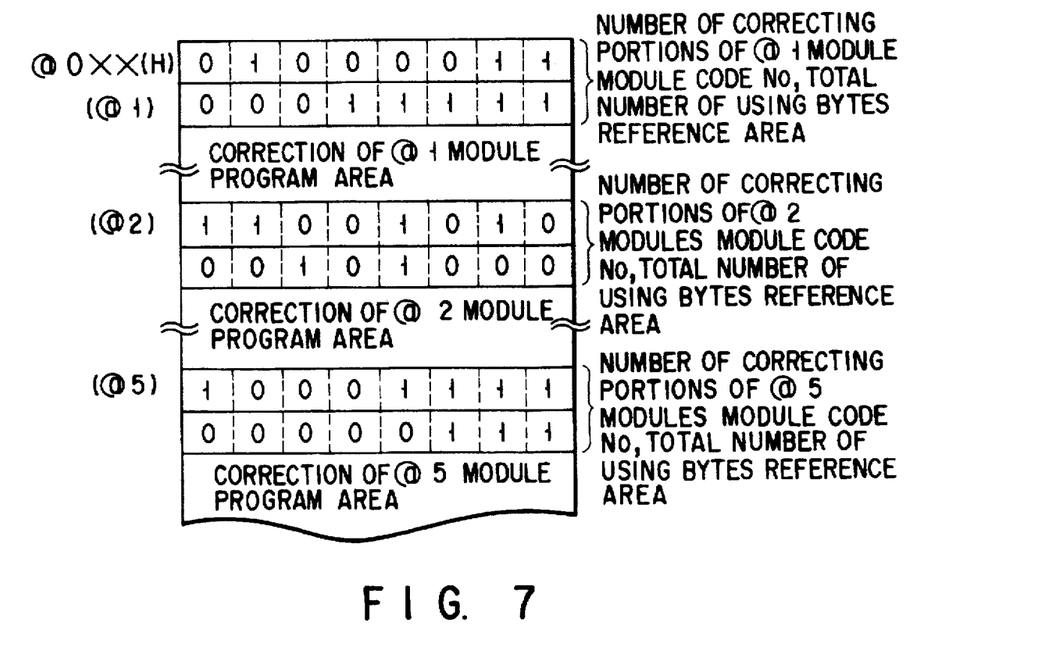
FIG. 7 is a view showing a module code No. and a reference area.

Then, communication with the EEPROM 28 is performed, "module code No. reference area" of code No. m is searched. As mentioned above, if the head address "@0xx (H)" of the ROM correction data area is predetermined, an address of a next module code No. reference area can be obtained by referring to the total number of use bytes of next one byte (head address +1). In other words, as shown in FIG. 7, the module No. reference area can be searched in order of new address and vice versa. The above-obtained number of correction S of code No. m and the head address ("0 xx (H)") of the ROM correction data area are stored (step S5).

At the same time, the first correction execution interruption address is stored in the PC value latch section 22 of the ROM correction processing circuit 24 of the microcomputer 12 of FIG. 1 (step S6), and further stored in a temporarily storing area 42 (FIG. 8) in a return address ROM 44 in the main program after the end of the correction program.

Then, the number of use bytes and the correction program head address are read from the stored number of correcting portions S and the head address of the ROM correction data area read from the EEPROM 28 in step S5. Moreover, the correction program area of the EEPROM 28 is referred by the read number of use bytes and the correction program head address, and correction program data is set in the correction execution area of the RAM 16 (step S8). In this case, regarding the subroutine module of code number No. m, since the correction program is read at the first time, the first correction program is read.

Then, if the ROM correction interruption is set to an allowable state (step S9), saved data in step S1 is returned to the register 36 such as the accumulator or the part of the area of the RAM 16 (original area) (step S10).

In step S11, the main program of the subroutine module of the code No. m is executed at the first time. If the correction execution interruption address set in step S6 is accessed by PC (not shown) during the execution of the main program, the PC comparison register section 20 generates a ROM correction interruption request to the CPU 14. The CPU 14 moves the processing to step 21 to execute the ROM correction interruption processing on the receipt of the request.

Then, if a nesting level is returned to the previous state in which no interruption is provided (step S21), data is returned to the register such as the accumulator and the part of the area of the RAM is saved prior to step S23 to be described later (step S22). Thereafter, the return address to the main program stored in the return address temporarily storing area 42 in step S7 is transferred to the storing area 44 (step S23).

Then, similar to step S10, data saved in step S22 is returned to the original area (step S24). Then, data is jumped to the head address of the correction program execution area 48 (step S25). Thereby, the CPU 14 accesses data of the correction program execution area, so that the execution of the correction program is started (step S26).

A jump instruction of "ROM correction data setting processing for next correcting portion" is written to the correction program to be set in the correction program execution area. This instruction is provided to all correction programs. Thereby, if the execution of the correction program in step S26 is ended, the correction program is jumped to the program of "ROM correction data setting processing for next correcting portion."

In the "ROM correction data setting processing for next correcting portion", data of the register such as the accumulator and data of the partial area of the RAM are saved (step S27) similar to step S1. Then, the stored number of correcting portions S is decremented (step S28). As a result of the decrement, it is checked whether or not the number of correcting portions is 0.

If the number of correcting portions S is 0, the processing goes to step S33 since there is no residual correcting portion in the subroutine module of code No. m. In step S29, if the number of correcting portions S is not 0, the processing goes to step S30 since there is still residual correcting portions. If the correction program of step S26 is nth—first correcting portion, correction interruption address of the nth correcting portion (next correcting portion) is read from the EEPROM 28 and stored in the PC value latch section 22 of the ROM correction processing circuit 24 (step S30).

Moreover, the return address to the main program after executing the nth correction program is stored from the EEPROM 28, and stored in the temporarily storing area 42 (step S31). Then, the nth correction program head address and the number of use bytes are read from the EEPROM 28, and the nth correction program is read from the EEPROM based on the head address and the number of use byte to be set in the correction execution area of RAM 3 (step S32).

Figure 8:
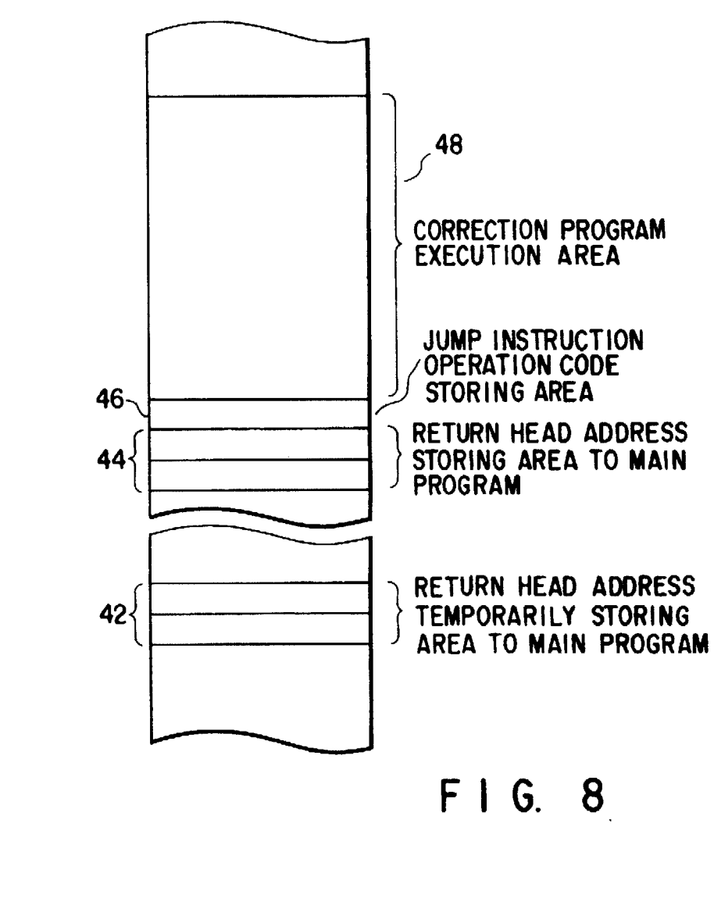
FIG. 8 is a view showing a temporary storing area in a return address ROM in a main program after the end of a correct program, a storing area, a jump instruction operation node storing area, and a correction program executing area.

Next, a jump instruction operation code is set to a jump instruction operation code storing area 46 (step S33). Then, if data saved in step S27 is returned to the original area (step S34), data is jumped to the jump instruction operation code storing area 46 (step S35). Thereby, the address of the jump instruction operation code storing area 46 is accessed by PC, and the instruction written in the storing areas 44 and 46 is executed. However, since the jump instruction operation code for returning the main program and the return head address are already written thereto, CPU 14 executes the instruction (step S36), and the processing is returned to the main program (step S10).

In the main program, if the correction processing of the predetermined correcting portion is ended, step S11 is ended and the subroutine module of code No. m is ended.

Figure 9:
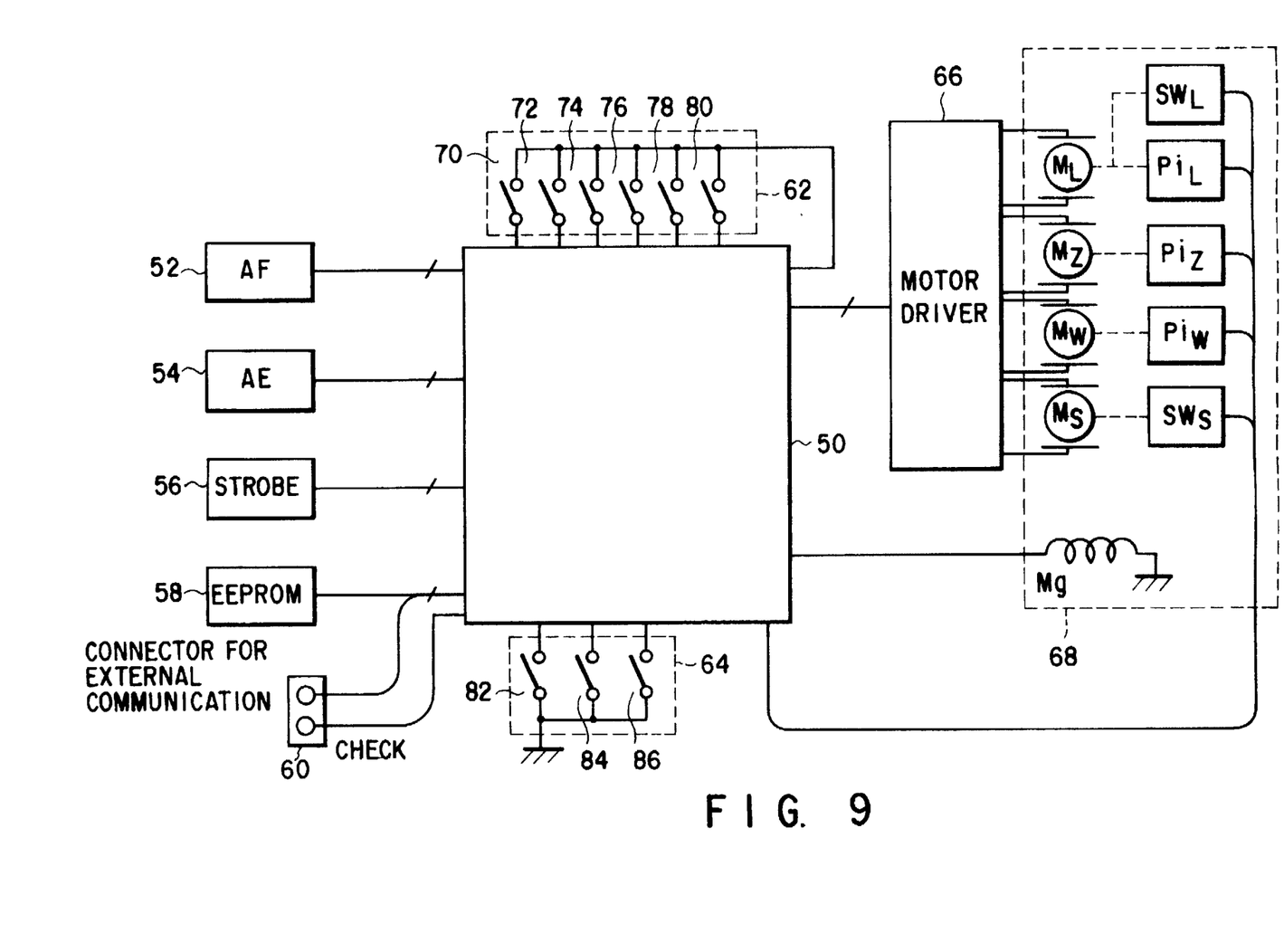
FIG. 9 is a view showing an example of the structure in which an actual camera is mounted on the microcomputer capable of executing the correction program to be controlled according to a first embodiment of the present invention.

FIG. 9 is a first embodiment of the present invention showing the structure in which an actual camera is mounted on the microcomputer capable of executing the correction program to be controlled.

In FIG. 9, a mirocomputer 50 performs for sequence of the entire camera and the control. A distance measuring section (AF) 52 for measuring a distance to a measuring object, a lightness measuring section (AE) 54 for measuring lightness of the measuring object, a stroboscope 56 for stroboscopic charging and light emitting, and an EEPROM 58, which is an electrically writable nonvolatile memory, for storing an adjustment value of the camera and ROM correction data, which is the feature of the present invention, are connected to the microcomputer 50. Moreover, an outer unit communication connector 60 for connecting an adjuster of the camera or a device for writing ROM correction data, a group of switches 62 and a group of switches 64, and a drive section 68, which comprises a plurality of motors for performing the operation of each section through a motor driver 66, and a font interrupter, are connected to the microcomputer 50.

The group of switches 62 comprises a first release switch 70, a second release switch 72, a zoom-up switch 74, a zoom-down switch 76, a mode switch 78, and a stroboscopic mode switch 80. The group of switches 64 comprises a power switch 82, a rear cover switch 84, and a rewinding switch 86.

The drive section 68 comprises a motor Ms for driving a shutter, a motor Mw for winding and rewinding a film, a motor Mz for driving a zoom lens, a motor ML for driving a focus lens, a switch SWL for detecting an initial position of the focus lens, a font interrupter PiL for detecting a mount of a unit drive (position) of the focus lens, a font interrupter Piz for detecting the position of the zoom lens, a font interrupter Piw for detecting a perforation of the film, a switch SWs for detecting an initial position of the shutter, and a magnet Mg for closing the shutter. A predetermined operation of each of the blocks is executed by the groups of switches 62 and 64.

Figure 10:
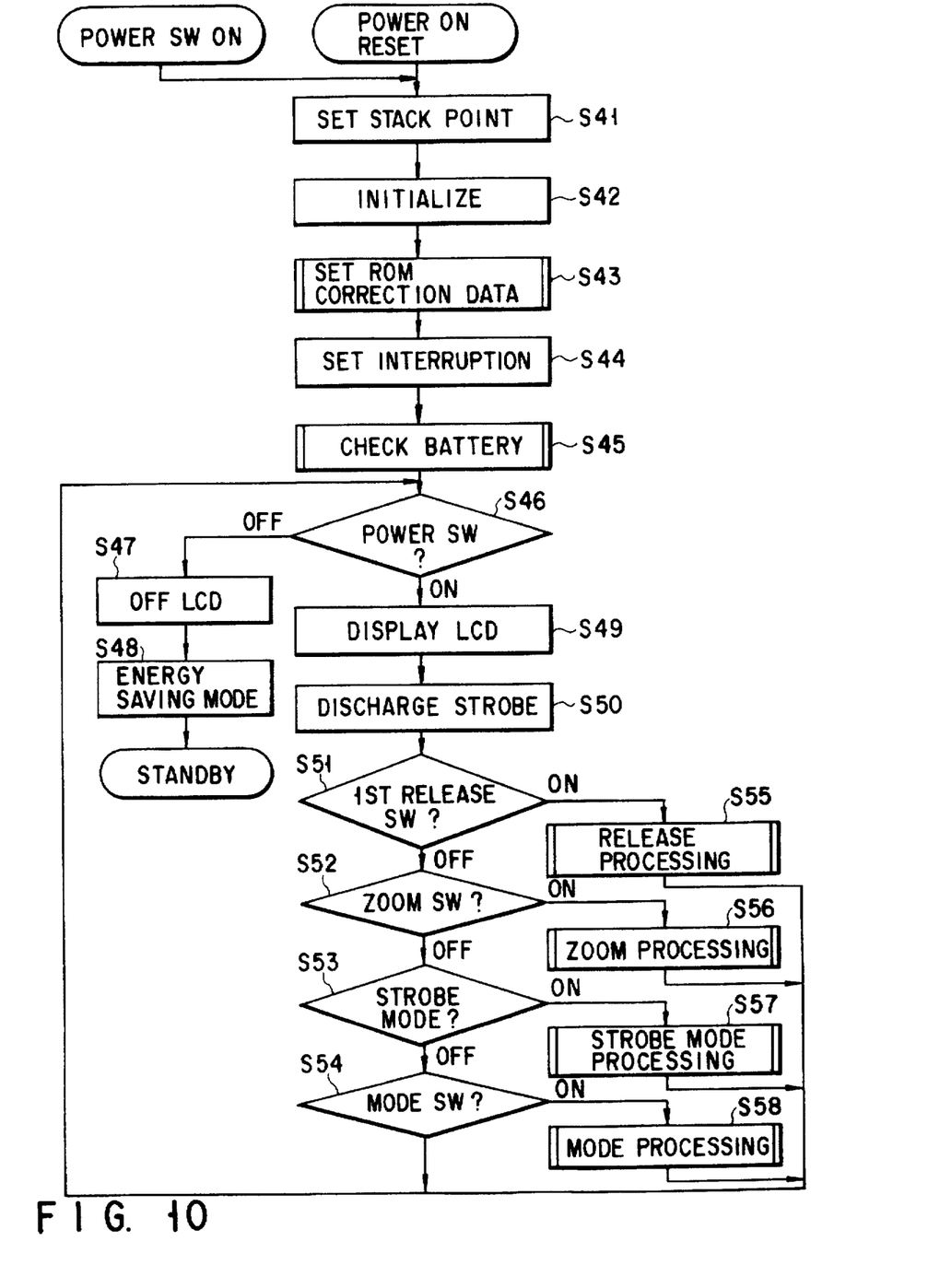
FIG. 10 is a flow chart explaining a control operation of the camera having the structure of FIG. 9.

The following will explain a controlling operation of the camera structured as shown by FIG. 9 with reference to a flow chart of FIG. 10.

First of all, if power is supplied, a power-on reset is functioned, so that a stack pointer of the microcomputer 50 is set (step S41). Thereafter, an I/O port and a register are initialized (step S42).

Then, by the execution of the subroutine of the ROM correction data setting, a correction execution flag, which shows the presence or non-presence of the correction of the subroutine module of the main flow chart, is transferred to a RAM (not shown) flag area of the microcomputer 50 from the EEPROM 58 (step S43). Then, a necessary interruption is allowed in a next interruption setting (step S44). Thereafter, a battery check is performed (step S45). If the battery is sufficient, the sequence of the camera is started.

First, an on/off state of a power SW 82 is checked (step S46). If the power SW 82 is turned off, a display of LCD (not shown) is extinguished (step S47). At the same time, an energy saving mode in which no current flows to a port is selected (step S48), so that a standby mode is set. On the other hand, if the power SW 82 is turned on in step S46, the display of LCD is performed (step S49), the stroboscopic charging is started (step S50).

Next, the state of the first release SW 70 is checked (step S51). If the first release SW 70 is turned on, a release processing is performed (step S55). If the first release SW 70 is turned off, it is checked that either the zoom-up SW 74 or the zoom-down SW 76 is turned on (step S52). If either the zoom-up SW 74 or the zoom-down SW 76 is turned on, a zoom processing is performed (step S56).

If both zoom-up SW 74 and zoom-down SW 76 are turned off, it is checked whether or not the stroboscopic mode SW 80 is turned on (step S53). If the stroboscopic mode SW 80 is turned on, a stroboscopic mode processing is performed (step S57). If the stroboscopic mode SW 80 is turned off, it is checked whether or not the mode SW 78 is turned on (step S54). If the mode SW 78 is turned on, a processing of the mode SW 78 is performed (step S58).

The processing operations of steps S49 to S58 are repeated until the power SW 82 is turned off.

Figures 11, 12A:
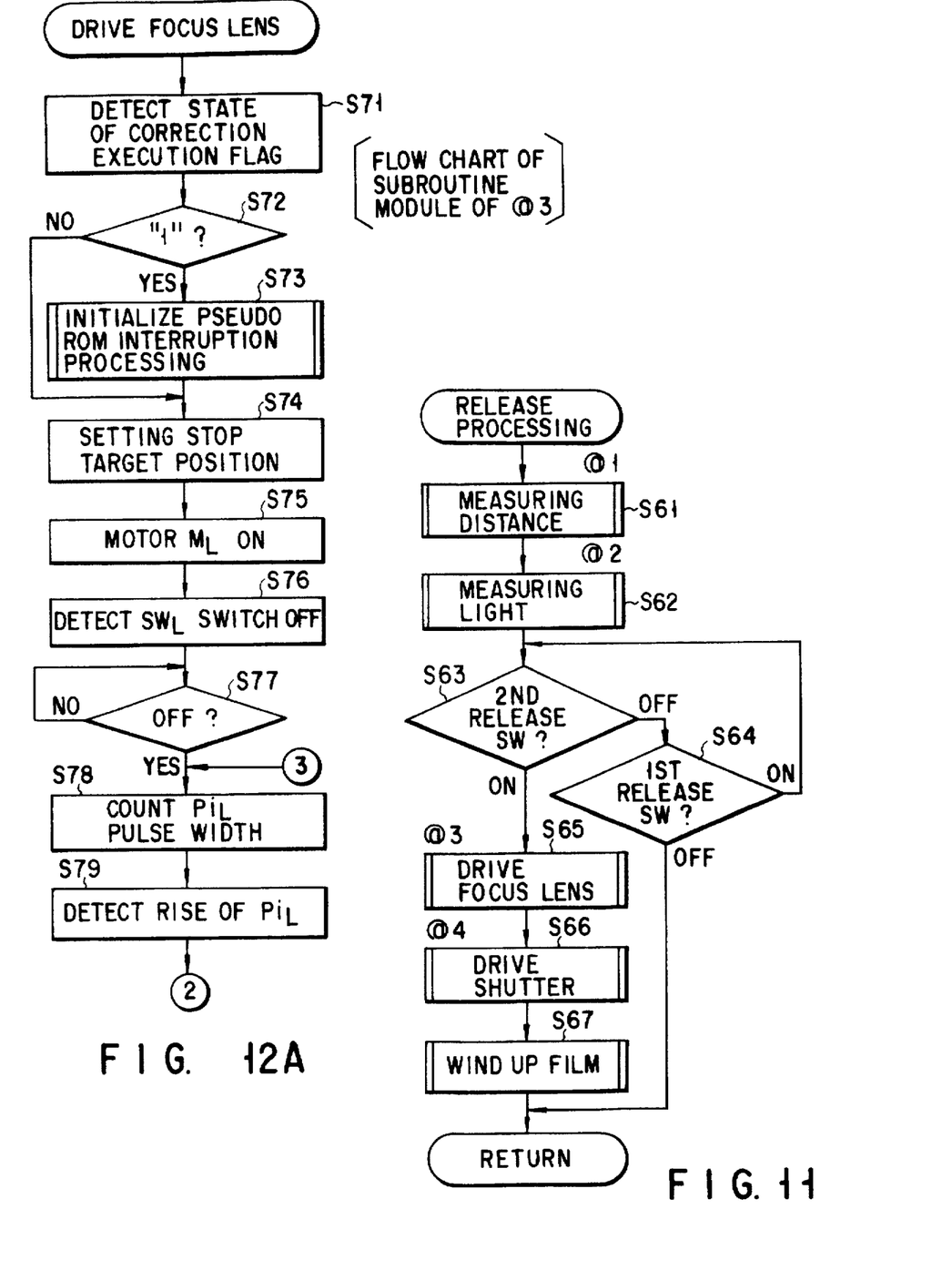
FIG. 11 is a flow chart showing an example of a release processing in the subroutine module in the main flow chart of FIG. 10.
FIGS. 12A and 12B are flow charts explaining an operation for actually correcting two portions in a focus lens drive of an @3 subroutine module.

FIG. 11 shows an example of a release processing in the subroutine module in the main flow chart of FIG. 10. In FIG. 11, @1 to @5 show subroutines to which code Nos. are added.

In the release processing, after the first release SW 70 is turned on, the distance measuring and the lightness measuring are performed by the distance measuring section 52 and the lightness measuring section 54 in steps S61 and S62, respectively. Thereafter, the on/off state of the second release SW 72 is checked (step S63). If the second release SW 72 is turned off, it is checked whether or not the first release SW 70 is turned on (step S64). If the first release SW 70 is turned on, the on-state is maintained. If the first release SW 70 is turned off, the release processing is stopped, and the operation is returned to the main flow.

The release SW is formed of two-stage switches having the first release SW and the second release SW. The first release SW is turned on at the first stage, and the second release SW is turned on at the second stage.

In step S63, if the second release SW 72 is turned on, a focus lens (not shown) is driven (step S65). Then, the camera is brought into focus, and the shutter is driven so that exposure is made (step S66). Finally, the film is wound up (step S67), and the release processing is ended.

In the above-explained release processing, when each of the subroutine modules is executed, the code No. of each of the subroutine modules (code Nos. corresponding to @1 to @5 are set to the head portion of the program of the respective subroutine modules) is read, and the flag area of the RAM 16 shown in FIG. 6 is searched.

For example, if @1 to @5 of FIG. 11 correspond to @1 to @5 of FIG. 6, it becomes clear that the correction interruption processing is generated since each bit is set to "1" in the subroutine modules of @1, @3, and @5 (distance measuring, focus lens driving, and film winding). Therefore, when these subroutine modules are executed, the processings in steps S4 to S28 in the flow charts of 4A and 4B are performed.

Figure 12B:
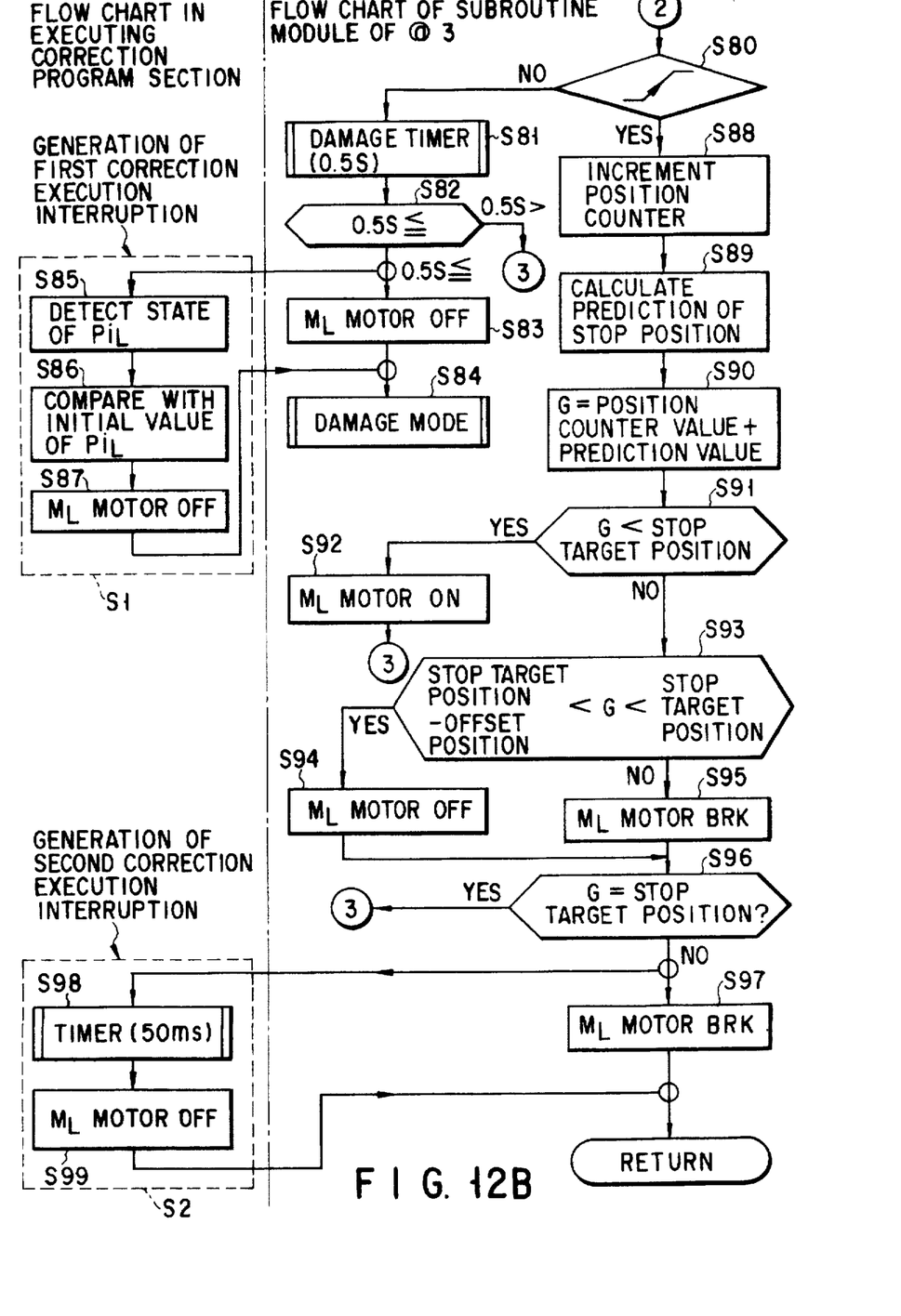

FIGS. 12A and 12B are flow charts explaining an operation for actually correcting two portions in a focus lens drive of the subroutine module of @3. In FIG. 12B, at the right side of one-dotted chain lines vertically written in the figure, there is shown the flow chart showing the content of the main program of the subroutine module of @3, and at the left side, there is shown the flow chart showing the correction program section in which a pseudo ROM interruption processing is provided to the main program.

First of all, as shown in FIG. 12A, a state of the normally set correction execution flag is detected (step S71). It is checked whether or not the detected flag is "1" (step S72). If the flag is "1", the pseudo ROM interruption processing is initialized (step S73). If the flag is not "1", the operation goes to step S74.

Then, if a stop target position of the focus lens is set (step S74), the motor ML is turned on (step S76). Then, the state of the switch SWL for detecting the initial position of the focus lens is checked (steps S76 and S77).

Just after the focus lens driving is started, a PiL pulse width count is started (step S78), and PiL rise is detected in order to count time of one period of the pulse (step S79). Then, a series of loops including an edge detection (step S80), count of damage timer (step S81), and a time limiter (0.5 s) detection of the damage timer is formed until the pulse rise of each period is detected.

Then, the first correction execution interruption is generated after the detection of the time limiter of the damage timer. In other words, since the execution of OFF operation (step S83) of the motor ML becomes improper in the main program, the correction program is executed by the pseudo ROM interruption processing as shown in the flow chart of step S1 (steps S85 to S87). Thereafter, the operation goes back to step S84 (damage mode of the main program).

On the other hand, if the edge is detected in step S80, the position counter is incremented (step S88), and a prediction value of a stop position is calculated (step S89). Thereafter, a value of a stop position is obtained (step S90), and the obtained value is compared with a predetermined target position (step S91). In this case, if the value is smaller than the stop target position, the the motor ML is turned on (step S92) and the operation goes to step S78.

On the other hand, if the value is larger than the stop target position, the motor ML is turned off (step S94) in accordance with the value (step S93). Or, the motor ML is braked (step S95). Thereby, if the stop target position is set, the operation goes to step S78. If not, the motor ML is further braked (step S97).

In the generation of the second correction execution interruption, the execution of brake, which is applied to the motor ML in step S97, becomes improper in the main program. In this case, the correction program as shown in the flow chart of step S2 (steps S98 and S99) is executed. Thereafter, the operation goes back to the main program.

As mentioned above, in each of the subroutine modules, the interruption processing is provided to the plurality of addresses, so that the correction can be added to the ROM, which is incapable of rewriting.

The present invention is not limited to the above-mentioned embodiment. It is of course possible that various modifications and applications may be made without departing from the gist of the present invention.

As mentioned above, according to the present invention, desirable correction program is written to a predetermined EEPROM. Thereby, even after the manufacture, corrections including the change of data can be carried out in executing the program of the ROM which is incapable of rewriting. Also, the correction program can be executed without breaking data of the register such as the accumulator, which is being used in the main program, or data of the part of the area of the RAM due to the processing for executing the correction program. Therefore, even if defectives of the program, which are necessary to be corrected, are found out just before the manufacture or in the course of the manufacture, the corrections for defectives and improvement can be easily carried out without the ROM mask used at the time of design.

As explained above, according to the present invention, there can be provided a (one-chip) mirocomputer, which is capable of correcting a plurality of portions of a program by use of one pseudo ROM interruption processing circuit without increasing a capacity of ROM regardless of the correcting portions.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A one-chip microcomputer capable of correcting a main program stored in a built-in mask ROM in a pseudo manner, comprising:

a first storing section for storing a correction address to be corrected of the main program stored in said mask ROM;

a second storing section for storing a correction program in accordance with said correction address;

comparing means for comparing said correction address stored in said first storing section with an address designated by a program counter so as to output a coincident signal when these addresses are coincident with each other;

program executing means for executing said correction program by an interruption processing in accordance with said coincident signal;

exchanging means for exchanging said correction address and said correction program to be used next in said first and second storing sections after the end of the execution of said correction program by said program executing means;

saving means for saving various data stored in a register of said one-chip microcomputer or a RAM prior to said exchanging operation of said exchanging means, and which saved data is used in executing a normal program; and returning means for returning said various data saved by said saving means to said register or to said RAM after the end of said exchanging operation of said exchanging means.

2. The one-chip microcomputer according to claim 1, wherein said first storing section stores only a single address.

3. The one-chip microcomputer according to claim 1, further comprising a third storing section for storing a return address for returning to a routine of the main program after the end of executing said correction program, wherein said return address is set by said exchanging means at the time of said exchanging operation.

4. The one-chip microcomputer according to claim 1, wherein said correction address and correction program are stored in an electrically rewritable nonvolatile storing unit provided in an outer unit of said one-chip microcomputer, and said electrically rewritable nonvolatile storing unit is connected to said one-chip microcomputer by a communication device.

5. The one-chip microcomputer according to claim 4, wherein said exchanging operation is transferred to said second storing section formed of a RAM from said electrically rewritable nonvolatile storing unit through said communication device after the end of executing said correction program.

6. The one-chip microcomputer according to claim 1, wherein said first storing section has an area for storing a number of correcting addresses by a module unit of said main program, and a number of residual correcting addresses is detected after the execution of the correction program by said program executing means, and wherein if the number of the residual correcting addresses is 0, said exchanging operation is not executed.

7. A one-chip microcomputer capable of executing a correction program, including a serial communication interface circuit capable of communicating with an outer memory and an outer unit through an outer bus, comprising:

a latching circuit for storing a predetermined correction address value;

a random access memory for storing a correction program in accordance with said correction address value;

writing means for writing said correction address value and said correction program from said outer memory to said latching circuit and to said random access memory through said serial communication interface circuit;

interruption generating means for comparing said address value stored in said latching circuit with a program count value during the execution of a main program stored in a main memory of said one-chip microcomputer so as to generate an interruption when said address value and said program counter value are coincident with each other;

program correcting means for executing said correction program stored in said random access memory by the generation of said interruption;

saving means for saving data so as not to change data used in a normal program and which is stored in the memory and used in both said main program and said correction program during a succession of processings of said main program and said correction program; and returning means for returning data saved by said saving means to an original memory after the end of the succession of the processings of said main program and said correction program.

8. A one-chip microcomputer according to claim 7, further comprising latch writing means for writing a correction address to be used next to said latching circuit at the time of the succession to said main program after the execution of the correction program by said program correcting means, and wherein said correction address value stored in said latching circuit corresponds to one address.

9. A one-chip microcomputer according to claim 8, wherein said correction address to be used next is read from said outer memory unit through said communication interface circuit after execution of said correction program.

10. A one-chip microcomputer according to claim 7, wherein said writing means reads said correction address value and said correction program from said outer memory unit through said communication interface circuit in accordance with a module of said main program so as to execute the writing operation.

11. A one-chip microcomputer capable of correcting a main program stored in a built-in mask ROM in a pseudo manner, comprising:

a storing section for storing a correction address to be corrected of the main program stored in said mask ROM;

comparing means for comparing said correction address stored in said storing section with an address designated by a program counter so as to output a coincident signal when these compared addresses are coincident with each other;

program executing means for executing said correction program in accordance with said coincident signal;

exchanging means for exchanging said correction address to be used next in said storing section after the end of the execution of said correction program by said program executing means;

saving means for saving various data stored in a register of said one-chip microcomputer or a RAM prior to said exchanging operation of said exchanging means, and which saved data is used in executing a normal program; and returning means for returning said various data saved by said saving means to said register or to said RAM after the end of said exchanging operation of said exchanging means.

12. A one-chip microcomputer capable of correcting a ROM, comprising:

setting means for setting one correction address of a plurality of addresses to be corrected in a program stored in said ROM;

correction program executing means for executing a correction program corresponding to said correction address when said correction address set by said setting means is coincident with a program counter;

saving means for saving data so as not to change data which is to be temporarily used in said one-chip microcomputer, and which saved data is used in executing a normal program, at the time of operation for changing said correction address to another correction address of said plurality of correction addresses after executing said correction program by said correction program executing means; and returning means for returning data saved by said saving means to an original memory after executing of said correction program by said correction program executing means.

* * * * *